US012706240B2

(12) United States Patent
Huang et al.

(10) Patent No.: US 12,706,240 B2

(45) Date of Patent: Aug. 11, 2026

(54) COUPLED INDUCTOR

(71) Applicant: CYNTEC CO., LTD., Hsinchu (TW)

(72) Inventors: Wei-Lun Huang, Hsinchu (TW); Sen-Huei Chen, Hsinchu (TW); Chi-Cheng Ma, Hsinchu (TW)

(73) Assignee: CYNTEC CO., LTD., Science Park (TW)

(*) Notice: Subject to any disclaimer, the term of this patent is extended or adjusted under 35 U.S.C. 154(b) by 1031 days.

(21) Appl. No.: 17/854,001

(22) Filed: Jun. 30, 2022

(65) Prior Publication Data

US 2023/0005658 A1 Jan. 5, 2023

Related U.S. Application Data

(60) Provisional application No. 63/251,047, filed on Oct. 1, 2021, provisional application No. 63/217,760, filed on Jul. 1, 2021.

(51) Int. Cl.

| | |
|---|---|
| ***H01F 27/24*** | (2006.01) |
| ***H01F 27/28*** | (2006.01) |
| ***H01F 27/29*** | (2006.01) |

(52) U.S. Cl.

CPC ............. *H01F 27/29* (2013.01); *H01F 27/24* (2013.01); *H01F 27/2823* (2013.01)

(58) Field of Classification Search

CPC ........................................................ H01F 27/29

USPC ......................................... 336/192, 221, 200

See application file for complete search history.

(56) References Cited

U.S. PATENT DOCUMENTS

2006/0145804 A1* 7/2006 Matsutani ............. H01F 27/292 336/200

2011/0148560 A1* 6/2011 Ikriannikov .......... H01F 27/306 336/192

2011/0286144 A1* 11/2011 Ikriannikov .......... H01F 27/292 29/606

2012/0188047 A1* 7/2012 Groves ............... H01F 17/0013 336/200

* cited by examiner

*Primary Examiner* — Ronald Hinson

(74) *Attorney, Agent, or Firm* — MUNCY, GEISSLER, OLDS & LOWE, P.C.

(57) ABSTRACT

A coupled inductor having a body, wherein a first electrode and a second electrode are connected to a first coil, and a third electrode and a fourth electrode are connected to a second coil, wherein a first horizontal line segment passing through the first electrode and the second electrode and a second horizontal line segment passing through the third electrode and the fourth electrode crosses each other at a location inside the periphery of a bottom surface of the body.

18 Claims, 13 Drawing Sheets

100

100

100

100

100

COUPLED INDUCTOR

CROSS-REFERENCES TO RELATED APPLICATIONS

This application claims the benefit of U.S. Provisional Patent Application No. 63/217,760 filed on Jul. 1, 2021 and U.S. Provisional Patent Application No. 63/251,047 filed on Oct. 1, 2021, which are hereby incorporated by reference herein and made a part of the specification.

BACKGROUND OF THE INVENTION

I. Field of the Invention

The present invention relates to a coupled inductor, and in particular to, an coupled inductor with higher coupling efficiency.

II. Description of Related Art

A conventional coupled inductor with inner and outer leads will cause leakage inductance which will reduce the K value. In addition, the gap the main coil and the secondary coil of the conventional coupled inductor will lead to leakage inductance as well. The leakage inductance will reduce coupling efficiency (K) of the coupled inductor.

Furthermore, the electrodes structure of a conventional coupled inductor will cause the layout of a circuit containing multiple coupled inductors difficult for routing wires.

Therefore, a better solution is needed to resolve the above-mentioned issues.

SUMMARY OF THE INVENTION

The present invention provides a coupled inductor having a first electrode and a second electrode electrically connected to the first conductive wire as well as a third electrode and a fourth electrically connected to the second conductive wire, wherein a first horizontal line segment passing through the first electrode and the second electrode and a second horizontal line segment passing through the third electrode and the fourth electrode crosses each other at a location inside the periphery of the first surface of the body for making a layout of a circuit containing multiple coupled inductors easier for routing wires.

The present invention provides a coupled inductor comprising a first coil and a second coil, wherein the winding turns of the first coil is interleaved with the winding turns of the second coil for increasing the coupling efficiency of the coupled inductor.

The present invention provides a coupled inductor comprising a first conductive wire and a second conductive wire, wherein the at least one first winding turn of the first conductive wire and the at least one second winding turn of the second conductive wire are encapsulated by a magnetic portion of the body, and a first terminal part of the second conductive wire is encapsulated by a non-magnetic portion of the body for increasing the coupling efficiency of the coupled inductor.

In one embodiment, a coupled inductor is disclosed, wherein the coupled inductor comprises: a body; a first conductive wire; and a second conductive wire; wherein at least one portion of the first conductive wire and at least one portion of the second conductive wire are disposed inside the body; a first electrode, a second electrode, a third electrode, and a fourth electrode, wherein the first electrode, the second electrode, the third electrode, and the fourth electrode are disposed on a first surface of the body, wherein the first electrode and the second electrode are electrically connected to the first conductive wire, and the third electrode and the fourth electrode are electrically connected to the second conductive wire, wherein two end points of a first horizontal line segment are respectively passing through the first electrode and the second electrode; and two end points of a second horizontal line segment are respectively passing through the third electrode and the fourth electrode, wherein the first horizontal line segment and the second horizontal line segment crosses each other at a location inside the periphery of the first surface of the body.

In one embodiment, the first conductive wire comprises a first coil comprising at least one first winding turn and a second coil comprising at least one second winding turn, wherein the at least one first winding turn of the first conductive wire and the at least one second winding turn of the second conductive wire are disposed inside the body.

In one embodiment, the first horizontal line segment is perpendicular to the second horizontal line segment.

In one embodiment, a first thickness of the first conductive wire is greater than a second thickness of the second conductive wire.

In one embodiment, a first portion of the at least one second winding turn of a second conductive wire is disposed between a second portion of the first conductive wire and a third portion of the first conductive wire.

In one embodiment, said first portion, said second portion, and said third portion are stacked along a vertical direction.

In one embodiment, the at least one first winding turn of the first conductive wire and the at least one second winding turn of the second conductive wire are encapsulated by the magnetic portion of the body, and a first terminal part of the second conductive wire is encapsulated by the non-magnetic portion of the body.

In one embodiment, the first electrode extends from a first edge to a second edge of the bottom surface of the body, and the second electrode extends from the first edge to the second edge of the bottom surface of the body, wherein said first edge and said second edge are two opposite edges of the bottom surface of the body, wherein the third electrode extends from a first edge to a second edge of the bottom surface of the body, wherein the third electrode is disposed along a third edge of the bottom surface of the body and the fourth electrode is disposed along a fourth edge of the bottom surface, wherein said third edge and said fourth edge are two opposite edges of the bottom surface of the body.

In one embodiment, the body comprises a magnetic body.

In one embodiment, the magnetic body comprises a T core, wherein the first coil and the second coil are wound around a pillar of the T core.

In one embodiment, an adhesive material is disposed in a space formed by a first winding turn of the first conductive wire and a second winding turn of the second conductive wire.

In one embodiment, a first lead is embedded inside the body with at least one portion of the lead exposed from the bottom surface of the body to form the first electrode.

In one embodiment, a first lead is embedded inside the body with at least one portion of the lead exposed from the bottom surface of the body to form the first electrode.

In one embodiment, a coupled inductor is disclosed, wherein the coupled inductor comprises: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body, wherein a first portion of the at least one second winding turn of a second conductive wire is disposed between a second portion of the first conductive wire and a third portion of the first conductive wire, wherein said first portion, said second portion, and said third portion are stacked along a vertical direction.

In one embodiment, a coupled inductor is disclosed, wherein the coupled inductor comprises: a body, comprising a magnetic portion and a non-magnetic portion; a first coil, comprising at least one first winding turn of a first conductive wire; and a second coil, comprising at least one second winding turn of a second conductive wire, wherein the at least one first winding turn of the first conductive wire and the at least one second winding turn of the second conductive wire are encapsulated by the magnetic portion of the body, and a first terminal part of the second conductive wire is encapsulated by the non-magnetic portion of the body.

In one embodiment, a coupled inductor is disclosed, wherein the coupled inductor comprises: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body; a first electrode, a second electrode, a third electrode, and a fourth electrode, wherein the first electrode, the second electrode, the third electrode, and the fourth electrode are disposed on a bottom surface of the body, wherein the first electrode and the second electrode are electrically connected to the first coil, and the third electrode and the fourth electrode are electrically connected to the second coil, wherein a first portion of the first lead is embedded inside the body with said first portion of the lead exposed from the bottom surface of the body to form the first electrode, wherein a second portion of the first lead is embedded inside the body, wherein the second portion of the first lead comprises a through opening and a portion of the body is disposed in the through opening.

In one embodiment, a coupled inductor is disclosed, wherein the coupled inductor comprises: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body; a first electrode, a second electrode, a third electrode, and a fourth electrode, wherein the first electrode and the second electrode are electrically connected to the first coil, and the third electrode and the fourth electrode are electrically connected to the second coil, wherein a lead is electrically connected to the third electrode, wherein a through hole is formed in the lead, wherein a soldering material is disposed on a top surface of the first portion of the lead and extends to a terminal part of an internal conductor of the second conductive wire via the through hole.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention, the drawings are briefly described as follows.

DESCRIPTION OF EMBODIMENTS

Figure 1A:
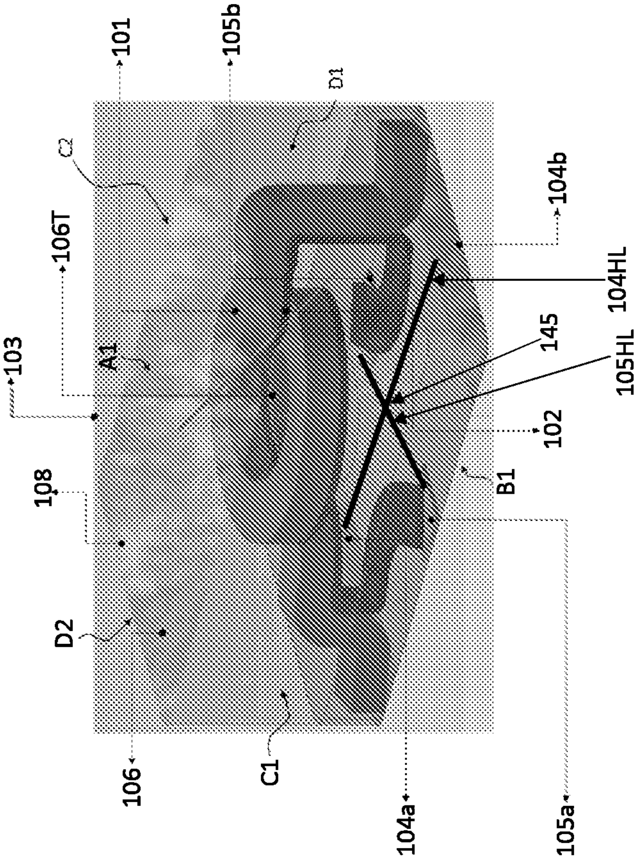
FIG. 1A shows a perspective view of a coupled inductor according to one embodiment of the present invention.

FIG. 1A shows a perspective view of a coupled inductor 100 according to one embodiment of the present invention.

As shown in FIG. 1A, the coupled inductor 100 comprises: a body 106; a first conductive wire 101; and a second conductive wire 102; wherein at least one portion of the first conductive wire 101 and at least one portion of the second conductive wire 102 are disposed inside the body 106; a first electrode 104*a*, a second electrode 104*b*, a third electrode 105*a*, and a fourth electrode 105*b*, wherein the first electrode 104*a*, the second electrode 104*b*, the third electrode 105*a*, and the fourth electrode 105*b* are disposed on a first surface, such as a bottom surface B1, of the body 106, wherein the first electrode 104*a* and the second electrode 104*b* are electrically connected to the first conductive wire 101, and the third electrode 105*a* and the fourth electrode 105*b* are electrically connected to the second conductive wire 102, wherein a first horizontal line segment 104HL passing through the first electrode 104*a* and the second electrode 104*b* and a second horizontal line segment 105HL passing through the third electrode 105*a* and the fourth electrode

105*b* crosses each other at a location 145 inside the periphery of the first surface, such as the bottom surface B1, of the body 106.

In one embodiment, the first horizontal line segment 104HL and the second horizontal line segment 105HL crosses each other at a location inside the periphery of the top surface A1, of the body 106.

In one embodiment, the first horizontal line segment 104HL is perpendicular to the second horizontal line segment 105HL.

In one embodiment, the first conductive wire 101 comprises a first coil comprising at least one first winding turn, and the second conductive wire 102 comprises a second coil comprising at least one second winding turn, wherein the at least one first winding turn of the first conductive wire 101 and the at least one second winding turn of the second conductive wire 102 are disposed inside the body 106.

In one embodiment, the at least one first winding turn of the first conductive wire 101 and the at least one second winding turn of the second conductive wire 102 are wound around a common axis 103.

In one embodiment, as shown in FIG. TA, the magnetic body 106 comprises a T core 106T, wherein the first coil and the second coil are wound around a pillar of the T core 106T.

In one embodiment, as shown in FIG. TA, the first electrode 104*a* extends from a bottom surface B1 of the body 106 to a first lateral surface D1 of the body 106.

In one embodiment, as shown in FIG. TA, the second electrode 104*b* extends from a bottom surface B1 of the body 106 to a second lateral surface D2 of the body 106, wherein the first lateral surface D1 and the second lateral surface D2 are two opposite lateral surfaces of the body 106.

In one embodiment, as shown in FIG. 1A, the third electrode 105*a* extends from a bottom surface B1 of the body 106 to a third lateral surface C1 of the body 106.

In one embodiment, as shown in FIG. 1A, the fourth electrode 105*b* from a bottom surface B1 of the body 106 to a fourth lateral surface C2 of the body 106, wherein the third lateral surface C1 and the fourth lateral surface C2 are two opposite lateral surfaces of the body 106.

In one embodiment, each of the first conductive wire 101 and the second conductive wire 102 is a flat wire.

In one embodiment, each of the first conductive wire 101 and the second conductive wire 102 is an enameled wire.

In one embodiment, each of the first conductive wire 101 and the second conductive wire 102 is a flat enameled wire.

In one embodiment, each of the first conductive wire 101 and the second conductive wire 102 is made by a film process.

Figures 1B, 1C, 1D:
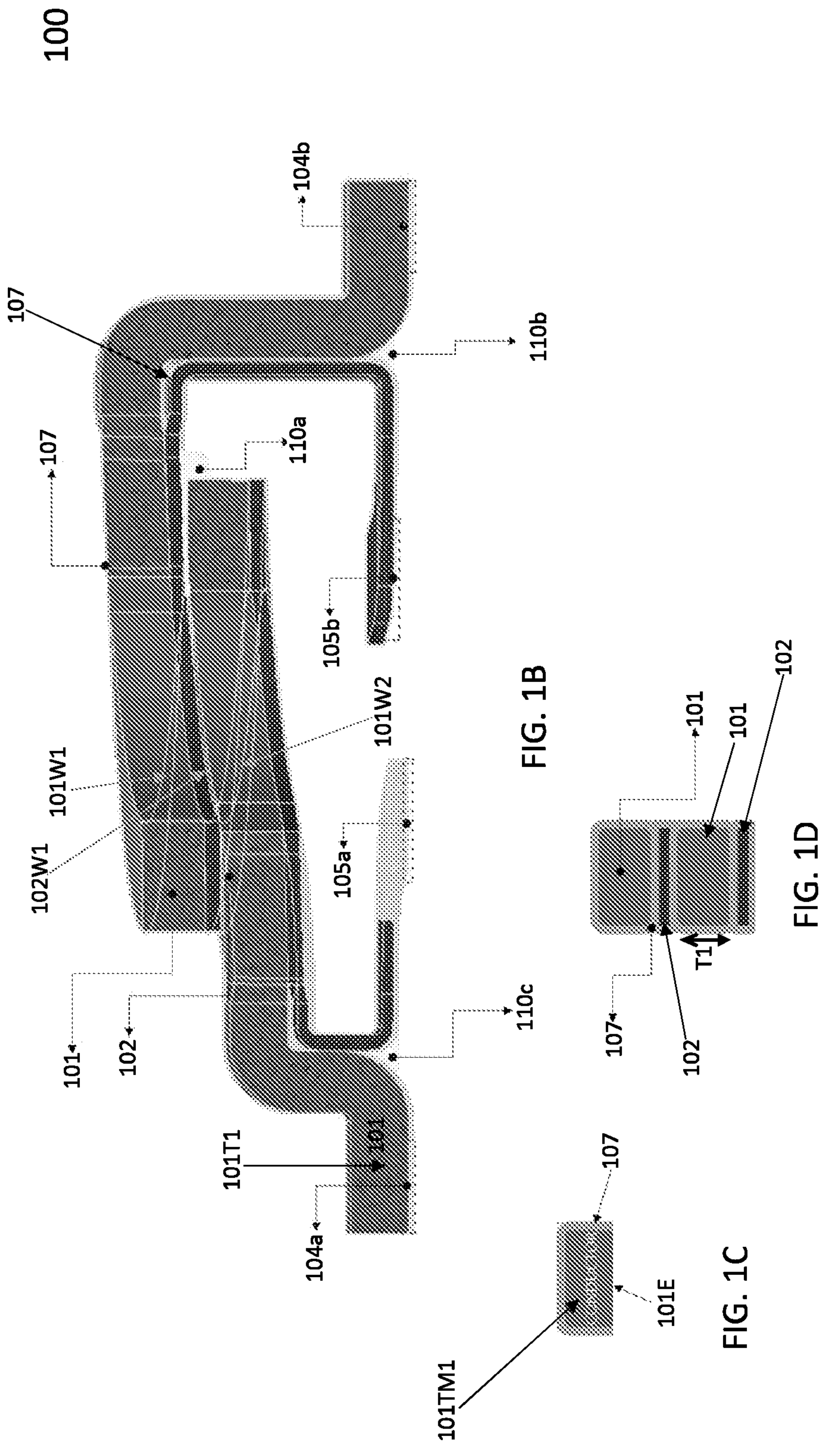
FIG. 1B shows a side view of a coupled inductor according to one embodiment of the present invention.
FIG. 1C shows a side view of a terminal part of a first conductive wire of a coupled inductor according to one embodiment of the present invention.
FIG. 1D shows a side view of coils structure of a coupled inductor according to one embodiment of the present invention.

In one embodiment, as shown in FIG. 1B, an insulating layer 107 is disposed on each of the first conductive wire 101 and the second conductive wire 102.

In one embodiment, as shown in FIG. 1B, an adhesive material 110*a* is disposed in a space formed by a first winding turn of the first conductive wire 101 and a second winding turn of the second conductive wire 102.

In one embodiment, as shown in FIG. 1B, an adhesive material 110*b* is disposed in a space formed by a first terminal part of the first conductive wire 101 and a first terminal part of the second conductive wire 102.

In one embodiment, as shown in FIG. 1B, an adhesive material 110*c* is disposed in a space formed by a second terminal part of the first conductive wire 101 and a second terminal part of the second conductive wire 102.

In one embodiment, as shown in FIG. 1C, a terminal part 101T1 of the first conductive wire 101 is encapsulated by the insulating layer 107 with a surface 101E of the internal conductor 101TM1 of the terminal part 101T1 of the first conductive wire is exposed for forming the first electrode 104*a*.

In one embodiment, as shown in FIG. 1D, a first thickness T1 of the first conductive wire 101 is greater than a second thickness of the second conductive wire 102.

In one embodiment, a first width of the first conductive wire is substantially equal to a second width of the second conductive wire.

In one embodiment, as shown in FIG. 1D, a first portion 102W1 of the at least one second winding turn of a second conductive wire 102 is disposed between a second portion 101W1 of the at least one first winding turn of the first conductive wire 101 and a third portion 101W2 of the at least one first winding turn of the first conductive wire 101.

In one embodiment, as shown in FIG. 1D, said first portion 102W1, said second portion 101W1 and said third portion 101W2 are stacked along a vertical direction.

In one embodiment, the body 106 is a magnetic body.

In one embodiment, an insulating layer 108 is disposed on the outer surface of the magnetic body 106.

In one embodiment, the insulating layer 108 comprises epoxy.

Figure 1E:
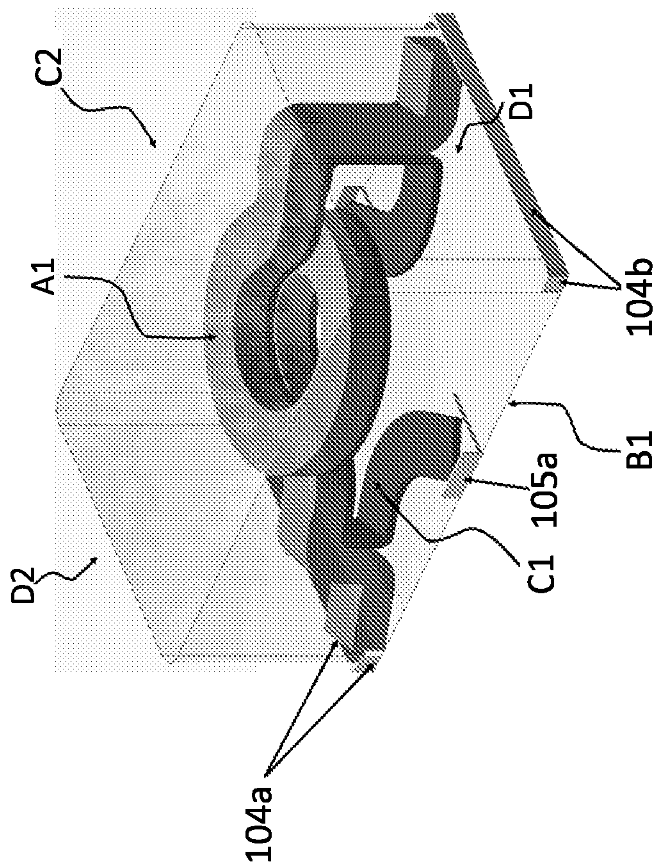
FIG. 1E shows a perspective view of a coupled inductor according to one embodiment of the present invention.

In one embodiment, as shown in FIG. 1E, the first electrode 104*a* extends from a bottom surface B1 of the body 106 to a first lateral surface D1 of the body 106, wherein the outer surface of the first electrode 104*a* comprises Sn.

In one embodiment, as shown in FIG. 1E, the second electrode 104*b* extends from a bottom surface B1 of the body 106 to a second lateral surface D2 of the body 106, wherein the outer surface of the second electrode 104*b* comprises Sn.

In one embodiment, as shown in FIG. 1E, the third electrode 105*a* extends from a bottom surface B1 of the body 106 to a third lateral surface C1 of the body 106, wherein the outer surface of the third electrode 105*a* comprises Sn.

In one embodiment, as shown in FIG. 1E, the fourth electrode 105*b* extends from a bottom surface B1 of the body 106 to a fourth lateral surface C2 of the body 106, wherein the outer surface of the fourth electrode 105*b* comprises Sn.

Figure 1F:
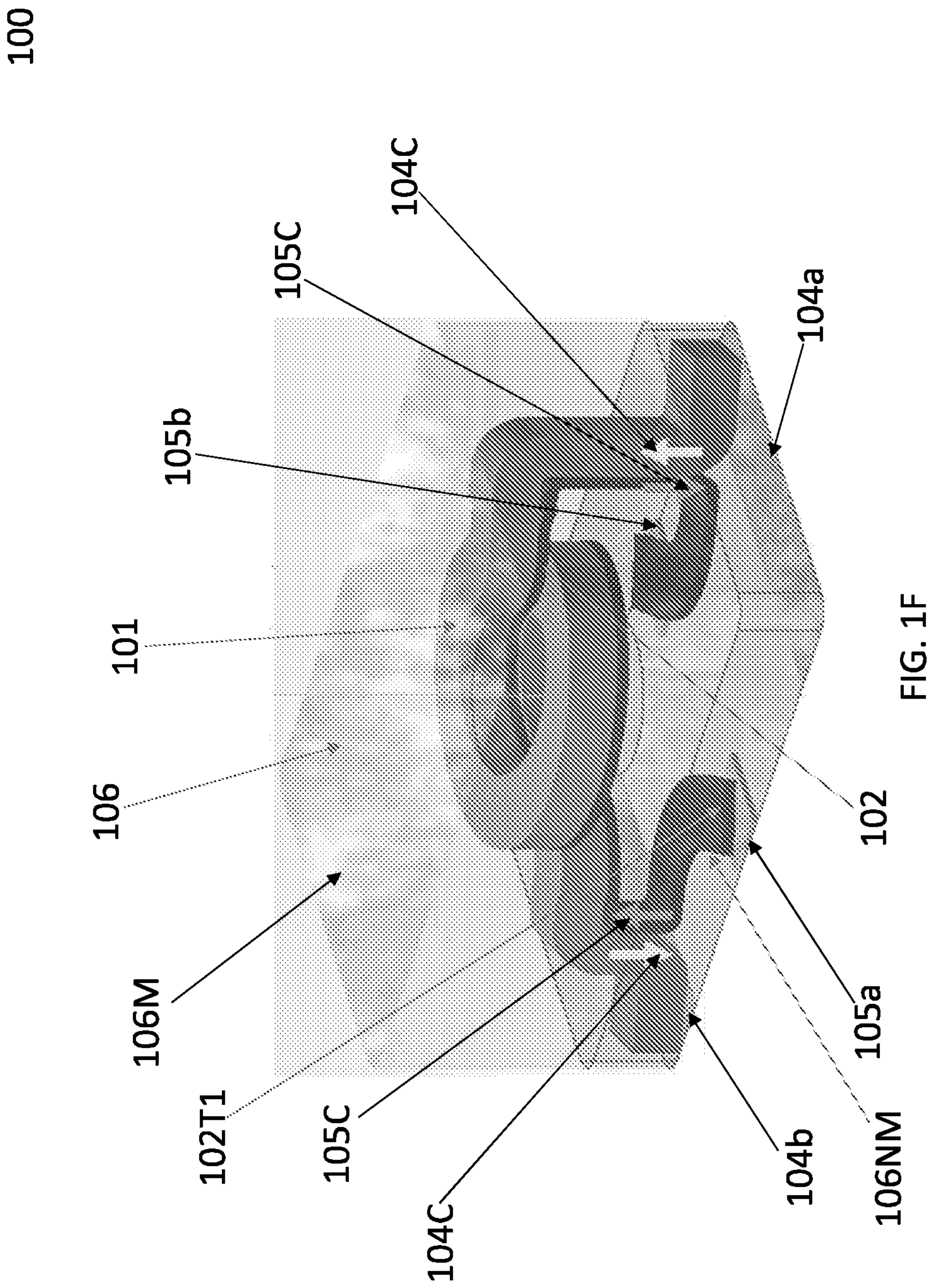
FIG. 1F shows current flows of a coupled inductor according to one embodiment of the present invention.

In one embodiment, as shown in FIG. 1F, a first current 104C flowing through the first coil of the first conductive wire 101 induces a second current 105C flowing through the second coil of the second conductive wire 102.

In one embodiment, as shown in FIG. 1F, the at least one first winding turn of the first conductive wire 101 and the at least one second winding turn of the second conductive wire 102 are encapsulated by a magnetic portion 106M of the body 106, and a first terminal part of the second conductive wire 102T1 is encapsulated by a first non-magnetic portion 106NM of the body 106.

In one embodiment, the at least one first winding turn of the first conductive wire 101 and the at least one second winding turn of the second conductive wire 102 are encapsulated by a magnetic portion 106M of the body 106, and a second terminal part of the second conductive wire is encapsulated by a second non-magnetic portion of the body 106.

Figure 1G:
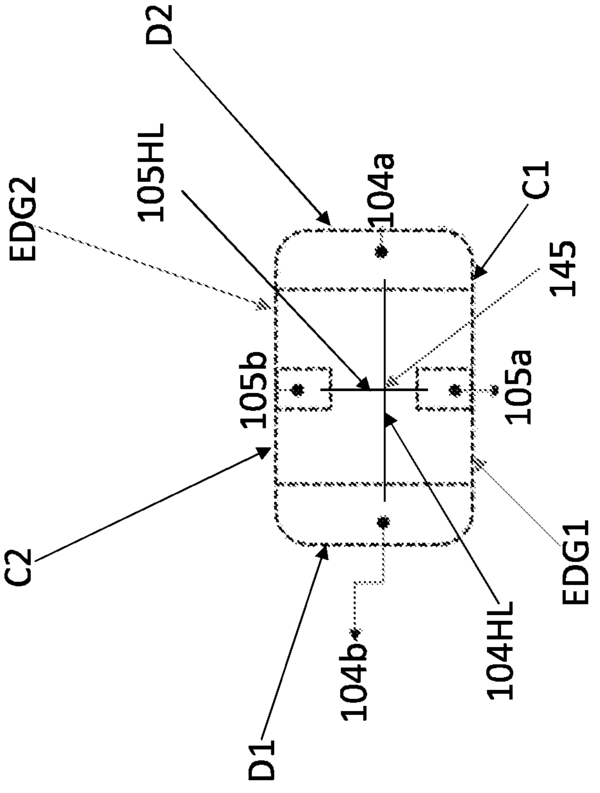
FIG. 1G shows electrodes structure of a coupled inductor according to one embodiment of the present invention.

In one embodiment, as shown in FIG. 1G, the first electrode 104*a* extends from a bottom surface B1 of the body 106 to a first lateral surface D1 of the body 106.

In one embodiment, as shown in FIG. 1G, the second electrode 104*b* extends from a bottom surface B1 of the body 106 to a second lateral surface D2 of the body 106, wherein the first lateral surface D1 and the second lateral surface D2 are two opposite lateral surfaces of the body 106.

In one embodiment, as shown in FIG. 1G, the third electrode 105*a* extends from a bottom surface B1 of the body 106 to a third lateral surface C1 of the body 106.

Figure 1H:
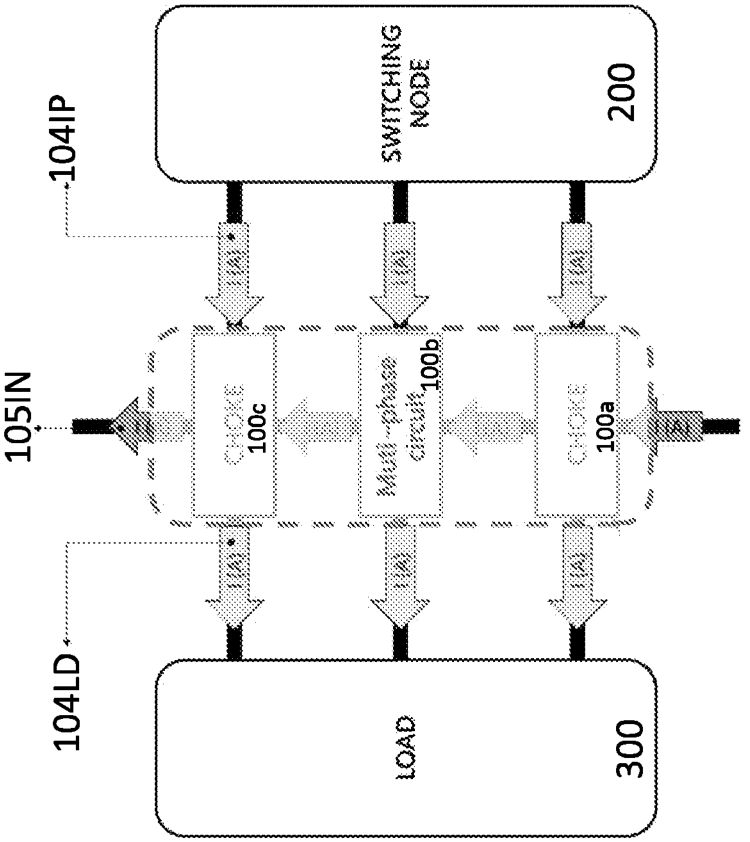
FIG. 1H shows a placement with multiple coupled inductors according to one embodiment of the present invention.
Figure 1I:
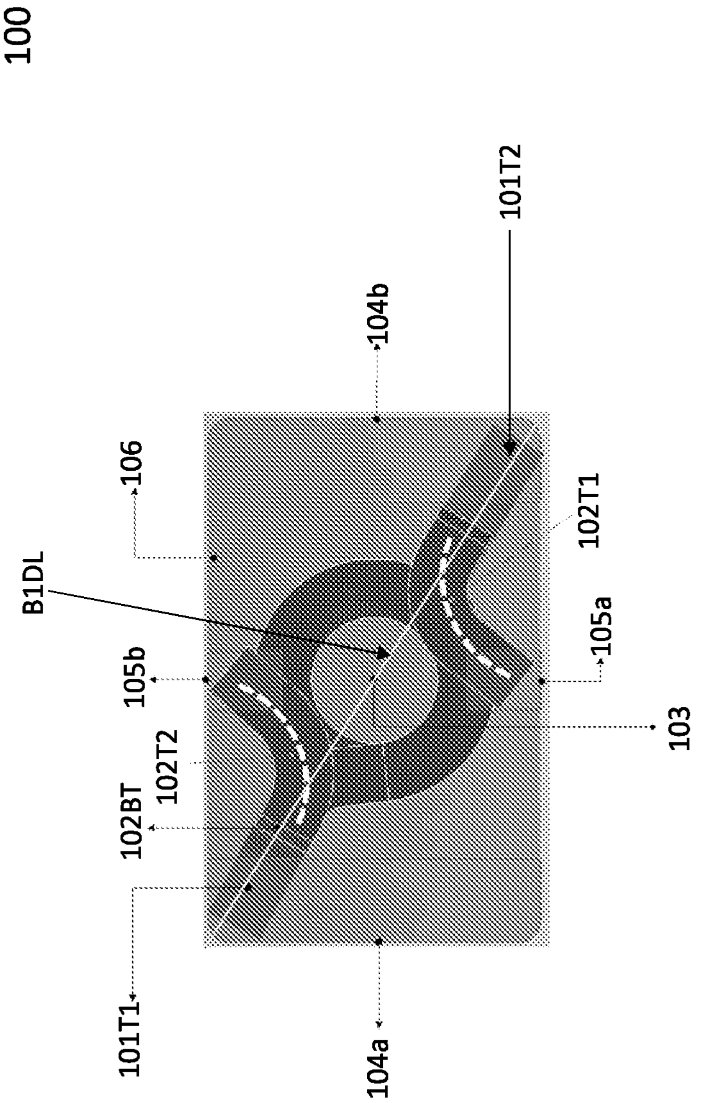
FIG. 1I shows a top view of a coupled inductor according to one embodiment of the present invention.

In one embodiment, as shown in FIG. 1I, the fourth electrode 105*b* from a bottom surface B1 of the body 106 to a fourth lateral surface C2 of the body 106, wherein the third lateral surface C1 and the fourth lateral surface C2 are two opposite lateral surfaces of the body 106.

In one embodiment, as shown in FIG. 1G, the first electrode 104*a* extends from a first edge EDG1 to a second edge EDG2 of the bottom surface of the body.

In one embodiment, as shown in FIG. 1G, the second electrode 104*b* extends from the first edge EDG1 to the second edge EDG2 of the bottom surface of the body 106, wherein the first edge and the second edge are two opposite edges of the bottom surface of the body 106.

In one embodiment, as shown in FIG. 1G, the third electrode 105*a* is disposed along the first edge EDG1 of the bottom surface of the body 106 and located between the first electrode 104*a* and the second electrode 104*b*.

In one embodiment, as shown in FIG. 1G, the fourth electrode 105*b* is disposed along the second edge EDG2 of the bottom surface of the body 106 and located between the first electrode 104*a* and the second electrode 104*b*.

In one embodiment, as shown in FIG. 1G, the first electrode 104*a* and the second electrode 104*b* are electrically connected to the first conductive wire 101, and the third electrode 105*a* and the fourth electrode 105*b* are electrically connected to the second conductive wire 102, wherein two end points of a first horizontal line segment 104HL are respectively passing through the first electrode 104*a* and the second electrode 104*b*; and two end points of a second horizontal line segment 105HL are respectively passing through the third electrode 105*a* and the fourth electrode 105*b*, wherein the first horizontal line segment 104HL and the second horizontal line segment 105HL crosses each other at a location 145 inside the periphery of the first surface such as the bottom surface B1 of the body 106.

In one embodiment, as shown in FIG. 1G, the first horizontal line segment 104HL is perpendicular to the second horizontal line segment 105HL.

In one embodiment, as shown in FIG. 1H, multiple coupled inductors 100*a*, 100*b*, 100*c* can be connected in series, wherein an inputs current 104IP from a switching node 200 is flowing through the first electrode 104*a* and the second electrode 105*a*, and an output current 104LD is generated and inputted to the load device 300, wherein the induced current 105IN generated by the coupled inductors 100*a*, 100*b*, 100*c* is flowing through in a direction to make the layout of the circuit much easier for routing wires.

In one embodiment, as shown in FIG. 1I, the first electrode 104*a* extends from a first edge EDG1 to a second edge EDG2 of the bottom surface of the body, wherein a first terminal part 101T1 of the first conductive wire 101 and a second terminal part 101T2 of the first conductive wire 101 are placed in two diagonal corners of the bottom surface of the body, wherein a diagonal line B1DL passes the first terminal part 101T1 and the second terminal part 101T2 of the first conductive wire 101.

In one embodiment, as shown in FIG. 1I, the second electrode 104*b* extends from the first edge EDG1 to the second edge EDG2 of the bottom surface of the body, wherein the first edge and the second edge are two opposite edges of the bottom surface of the body.

In one embodiment, as shown in FIG. 1I, the third electrode 105*a* is disposed along the first edge EDG1 of the bottom surface of the body and located between the first electrode 104*a* and the second electrode 104*b*.

In one embodiment, as shown in FIG. 1I, the fourth electrode 105*b* is disposed along the second edge EDG2 of the bottom surface of the body and located between the first electrode 104*a* and the second electrode 104*b*.

In one embodiment, as shown in FIG. 1I, a terminal part 102T2 of the second conductive wire 102 is bending from a portion 102BT to the fourth electrode 105*b*.

In one embodiment, as shown in FIG. 1I, a terminal part 102T1 of the second conductive wire 102 is bending to the third electrode 105*a*.

In one embodiment, as shown in FIG. 1I, the first electrode 104*a* extends from a first edge EDG1 to a second edge EDG2 of the bottom surface of the body, wherein a first terminal part 101T1 of the first conductive wire 101 and a second terminal part 101T2 of the first conductive wire 101 are placed in two diagonal corners of the bottom surface of the body.

Figure 1J:
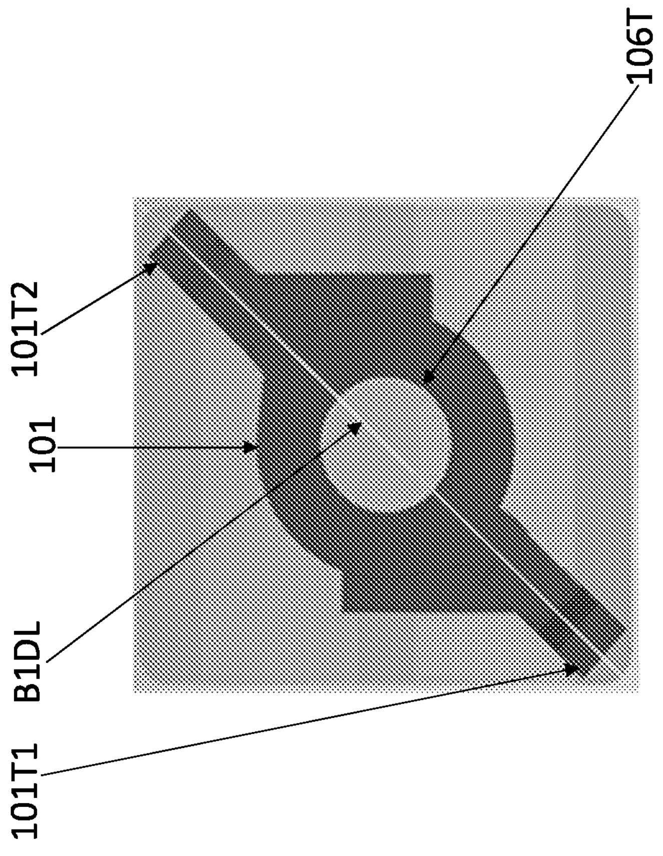
FIG. 1J shows a top view of a coupled inductor according to one embodiment of the present invention.

In one embodiment, as shown in FIG. 1J, the second electrode 104*b* extends from the first edge EDG1 to the second edge EDG2 of the bottom surface of the body, wherein the first edge and the second edge are two opposite edges of the bottom surface of the body.

Figure 1K:
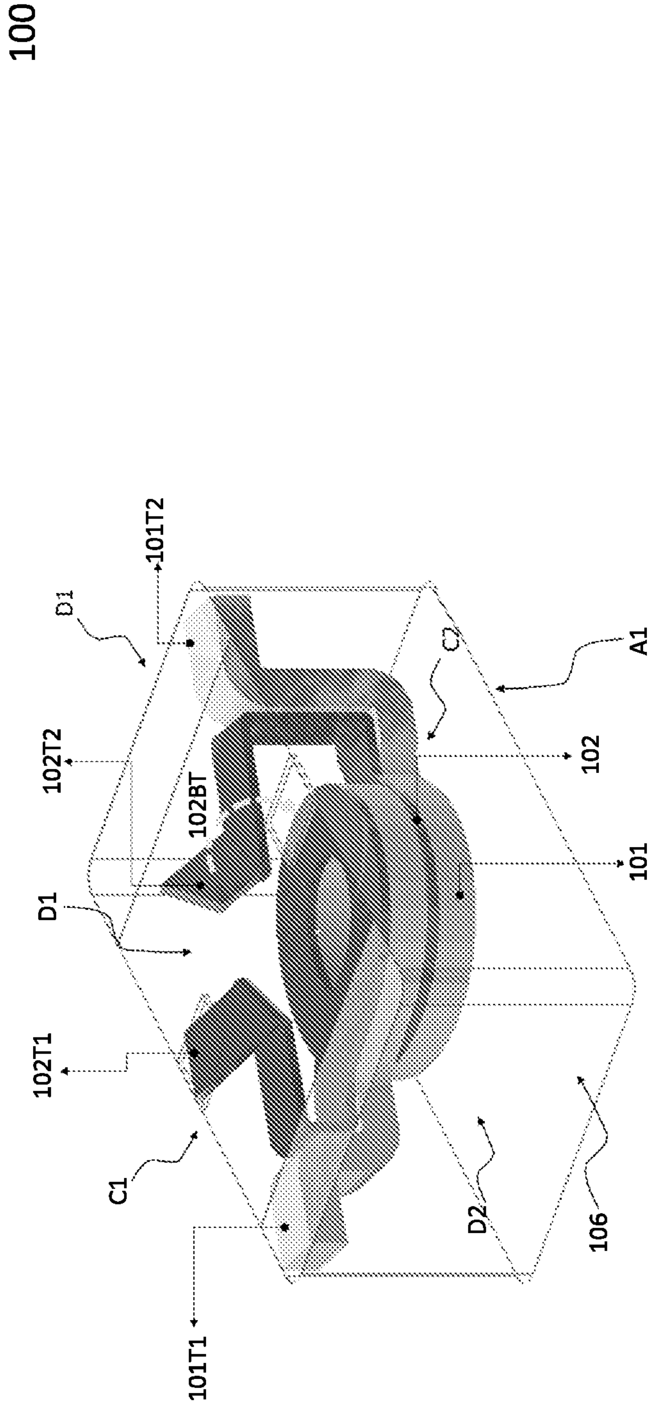
FIG. 1K shows a perspective view of a coupled inductor according to one embodiment of the present invention.

In one embodiment, as shown in FIG. 1K, the first electrode 104*a* extends from a first edge EDG1 to a second edge EDG2 of the bottom surface of the body, wherein a first terminal part 101T1 of the first conductive wire 101 and a second terminal part 101T2 of the first conductive wire 101 are placed in two diagonal corners of the bottom surface of the body.

In one embodiment, as shown in FIG. 1K, a first terminal part 102T1 of the second conductive wire 101 and a second terminal part 102T2 of the second conductive wire 101 are bending to the locations of the third electrode 105*a* and the fourth electrode 105*b*.

Figure 1M:
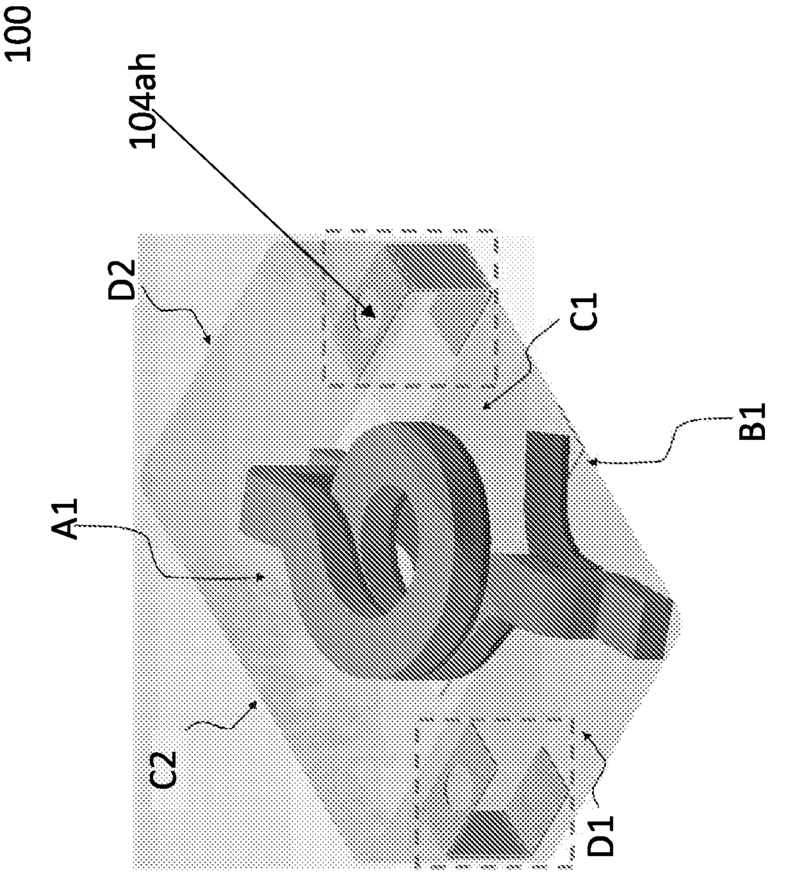
FIG. 1M shows a perspective view of a coupled inductor according to one embodiment of the present invention.
Figure 1L:
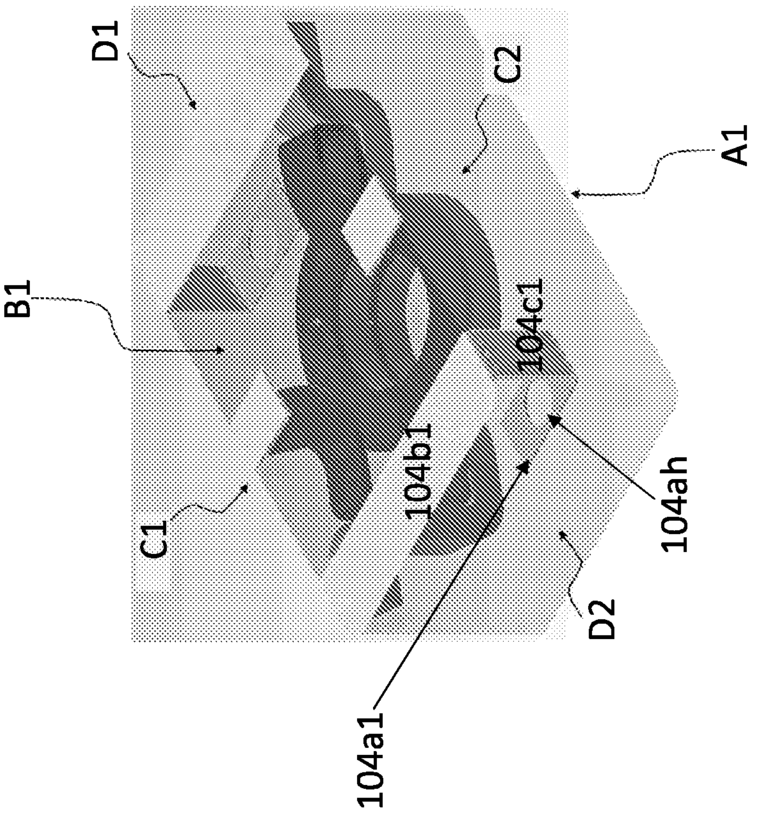
FIG. 1L shows a perspective view of a coupled inductor according to one embodiment of the present invention.

In one embodiment, as shown in FIG. 1L, a first lead is embedded inside the body with at least one portion of the lead exposed from the bottom surface of the body to form the first electrode.

In one embodiment, as shown in FIG. 1M, a first lead is embedded inside the body with at least one portion of the first lead exposed from the bottom surface of the body to form the first electrode, wherein a first through hole 104*ah* is formed in the first lead and a portion of the body is disposed in the through hole 104*ah*, for making the mechanical structure between the first lead and the body stronger.

In one embodiment, as shown in FIG. 1L, a first lead is embedded inside the body with a first portion 104*b*1 of the lead exposed from the bottom surface of the body to form the first electrode, wherein the first portion 104*b*1 extends to a second portion 104*a*1 opposite to the first portion via a third portion 104*c*1, wherein a first through hole 104*ah* is formed in the second portion 104*a*1 of the first lead for allowing the body extending through the first through hole 104*ah* for making the mechanical structure between the first lead and the body stronger.

In one embodiment, a coupled inductor is disclosed, wherein the coupled inductor comprises: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body; a first electrode, a second electrode, a third electrode, and a fourth electrode, wherein the first electrode, the second electrode, the third electrode, and the fourth electrode are disposed on a bottom surface of the body, wherein the first electrode and the second electrode are electrically connected to the first coil, and the third electrode and the fourth electrode are electrically connected to the second coil, wherein a first portion of the first lead is embedded inside the body with said first portion of the lead exposed from the bottom surface of the body to form the first electrode, wherein a second portion of the first lead is embedded inside the body, wherein the second portion of the first lead comprises a through opening and a portion of the body is disposed in the through opening.

In one embodiment, a coupled inductor is disclosed, wherein the coupled inductor comprises: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body, wherein a first portion of the at least one second winding turn of a second conductive wire is disposed between a second portion of the first conductive wire and a third portion of the first conductive wire, wherein said first portion, said second portion, and said third portion are stacked along a vertical direction.

In one embodiment, a coupled inductor is disclosed, wherein the coupled inductor comprises: a body, comprising a magnetic portion and a non-magnetic portion; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are encapsulated by the magnetic portion of the body, and a first terminal part of the second conductive wire is encapsulated by the non-magnetic portion of the body.

Figure 2B:
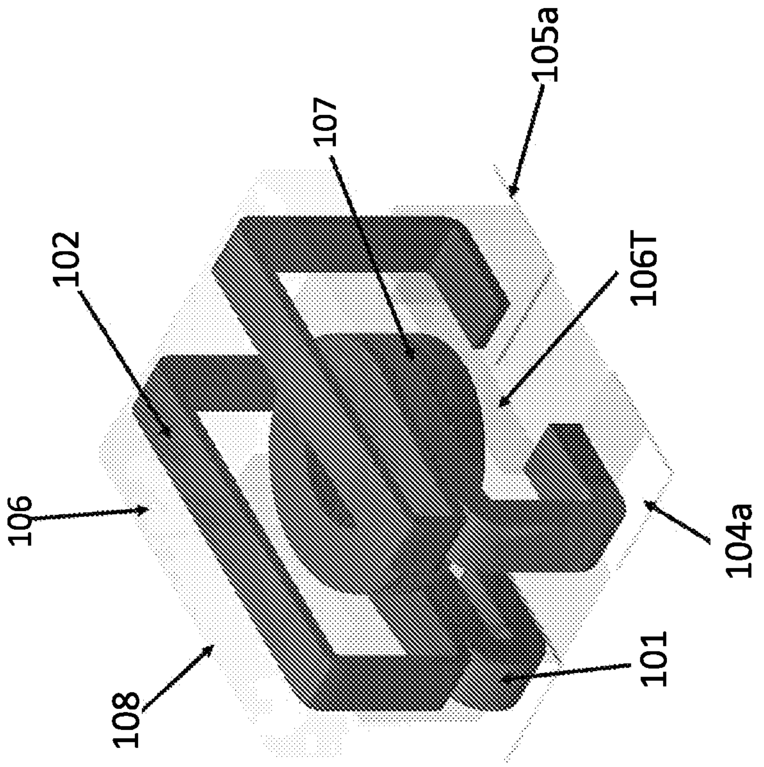
FIG. 2B shows a perspective view of a coupled inductor according to one embodiment of the present invention.
Figure 2A:
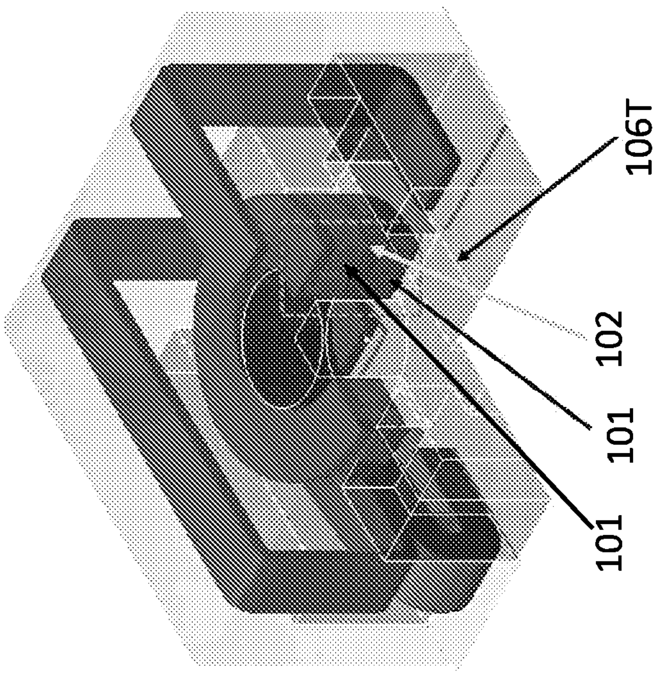
FIG. 2A shows a perspective view of a coupled inductor according to one embodiment of the present invention.

In one embodiment, as shown in FIG. 2A and FIG. 2B, a coupled inductor, comprising: a body; a first coil, comprising at least one first winding turn of a first conductive wire; and a second coil, comprising at least one second winding turn of a second conductive wire; wherein the at least one first winding turn of the first conductive wire and the at least one second winding turn of the second conductive wire are disposed inside the body, wherein a first portion of the at least one second winding turn of a second conductive wire is disposed between a second portion of the first conductive wire and a third portion of the first conductive wire, wherein said first portion, said second portion, and said third portion are stacked along a vertical direction.

Figure 2D:
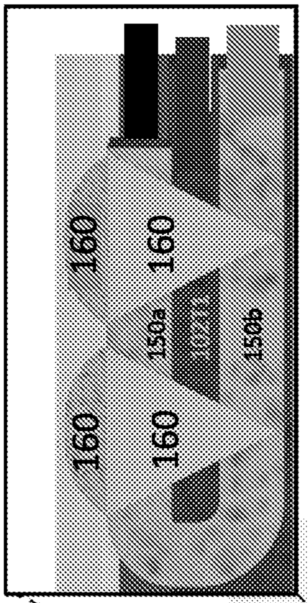
FIG. 2D shows a side view of a soldering structure of electrodes of a coupled inductor according to one embodiment of the present invention.
Figure 2C:
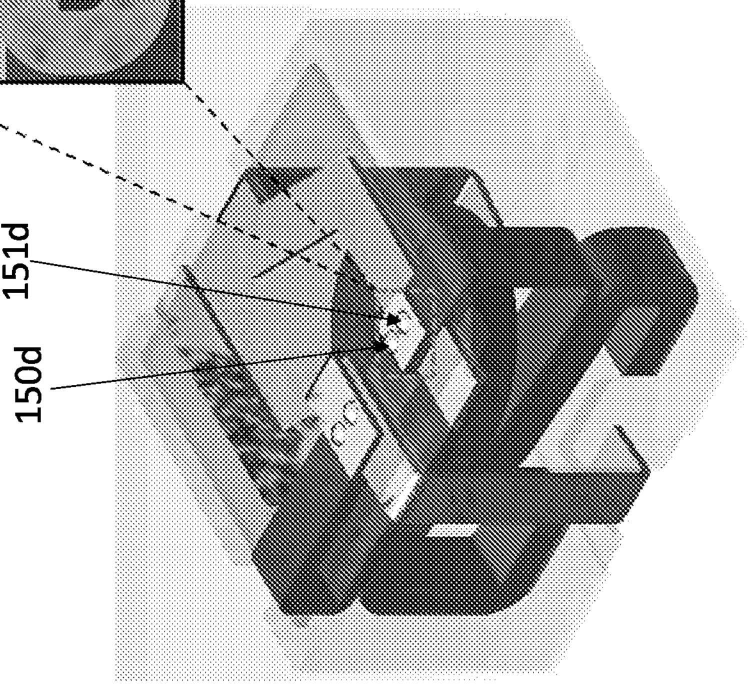
FIG. 2C shows a perspective view of a coupled inductor according to one embodiment of the present invention.

In one embodiment, as shown in FIG. 2C, a terminal part of the second conductive wire 102 is disposed between a first portion 150*a* and a second portion 150*b* of a first lead, wherein a first through hole 150*d* is formed in the first lead for making the soldering structure stronger.

In one embodiment, as shown in FIG. 2C, wherein a second through hole 151*d* is formed in the first lead for making the soldering structure stronger.

In one embodiment, as shown in FIG. 2D, a soldering material 160 is disposed on atop surface of the first portion 150*a* and extends to a terminal part of the second conductive wire 102T1 and the second portion 150*b* of a first lead via the first through hole 150*d* for making the soldering structure stronger.

In one embodiment, as shown in FIG. 2D, a soldering material 160 is disposed on a top surface of the first portion 150*a* and extends to a terminal part 102T1 of the second conductive wire 102 and the second portion 150*b* of a first lead via the second through hole 151*d* for making the soldering structure stronger.

Figure 2E:
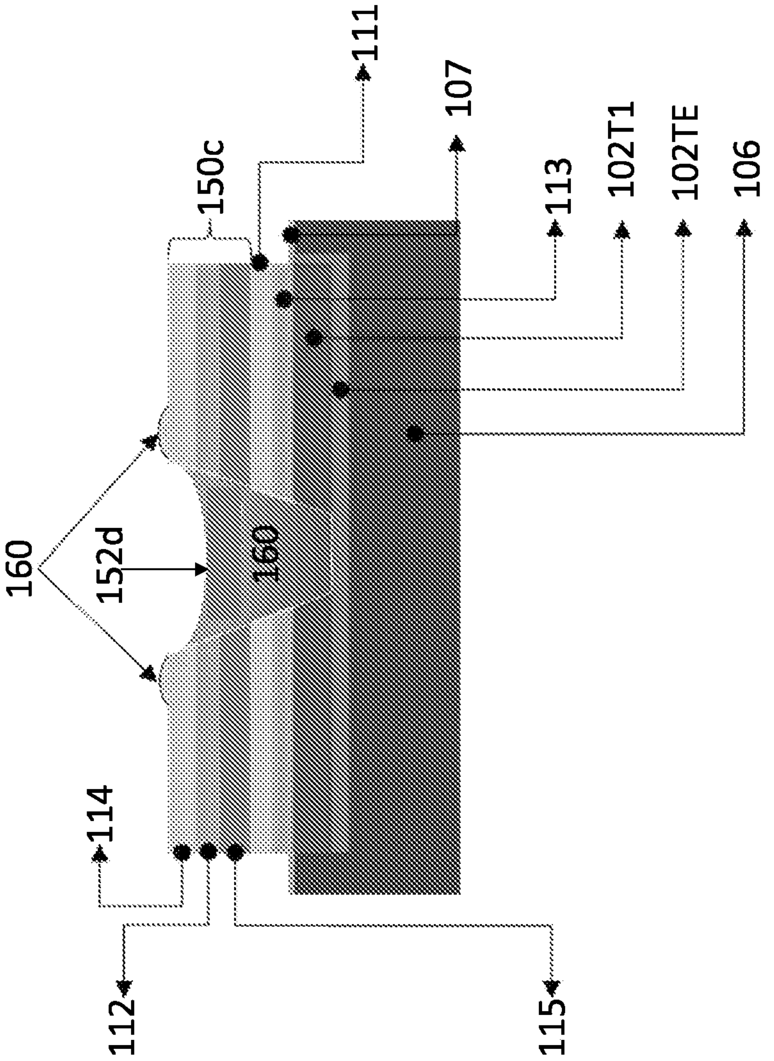
FIG. 2E shows a side view of a soldering structure of electrodes of a coupled inductor according to one embodiment of the present invention.

In one embodiment, as shown in FIG. 2E, a soldering material 160 is disposed on a top surface of the first portion 150*a* of a lead 150*c* and extends to a terminal part of the second conductive wire 102T1 via the through hole 152*d* formed in the lead 150*c* for making the soldering structure stronger.

In one embodiment, as shown in FIG. 2E, the soldering material 160 is can be in contact with an insulation layer 102TE on the bottom surface of the second conductive wire 102T1, wherein the top surface of the internal conductor of the second conductive wire 102T1 is exposed for contacting the soldering material 160.

In one embodiment, as shown in FIG. 2E, the lead 150*c* comprises a copper layer 115, a first nickel layer 112, and a first tin layer 114, wherein the first nickel layer 112 is disposed on the copper layer 115 and the first tin layer 114 is disposed on the first nickel layer 112.

In one embodiment, as shown in FIG. 2E, a second nickel layer 113 is disposed on the terminal part 102T1 of the second conductive wire 102 and a second tin layer 111 is disposed on the second nickel layer 113, wherein the lead 150*c* is disposed on the second tin layer 111.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims not by the above-detailed descriptions.

What is claimed is:

1. A coupled inductor, comprising:

a body;

a first conductive wire;

a second conductive wire, wherein at least one portion of the first conductive wire and at least one portion of the second conductive wire are disposed inside the body;

a first electrode, a second electrode, a third electrode, and a fourth electrode disposed on a first surface of the body, wherein the first electrode and the second electrode are electrically connected to the first conductive wire, and the third electrode and the fourth electrode are electrically connected to the second conductive wire, and wherein a first horizontal line segment passing through the first electrode and the second electrode and a second horizontal line segment passing through the third electrode and the fourth electrode cross each other at a location inside a periphery of the first surface of the body; and an insulating layer disposed on each of the first conductive wire and the second conductive wire, wherein the at least one portion of the first conductive wire and the at least one portion of the second conductive wire are stacked together with the insulating layer along a vertical direction and wherein the insulating layer interfaces each of the at least one portion of the first conductive wire and the at least one portion of the second conductive wire.

2. The coupled inductor according to claim 1, wherein the at least one first winding turn of the first conductive wire and the at least one second winding turn of the second conductive wire are encapsulated by a magnetic portion of the body, and a first terminal part of the second conductive wire is encapsulated by a non-magnetic portion of the body.

3. The coupled inductor according to claim 1, wherein the first horizontal line segment is perpendicular to the second horizontal line segment.

4. The coupled inductor according to claim 1, wherein each of the first conductive wire and the second conductive wire is a flat wire.

5. The coupled inductor according to claim 1, wherein each of the first conductive wire and the second conductive wire is an enameled wire.

6. The coupled inductor according to claim 1, wherein each of the first conductive wire and the second conductive wire is made by a film process.

7. The coupled inductor according to claim 1, wherein a first thickness of the first conductive wire is greater than a second thickness of the second conductive wire.

8. The coupled inductor according to claim 1, wherein a first width of the first conductive wire is substantially equal to a second width of the second conductive wire.

9. The coupled inductor according to claim 1, wherein an adhesive material is disposed in a space formed by a first winding turn of the first conductive wire and a second winding turn of the second conductive wire.

10. The coupled inductor according to claim 1, wherein the first conductive wire comprises a first coil comprising at least one first winding turn and a second coil comprising at least one second winding turn, wherein the at least one first winding turn of the first conductive wire and the at least one second winding turn of the second conductive wire are disposed inside the body, wherein a first portion of the at least one second winding turn of the second conductive wire is disposed between a first portion of the first conductive wire and a second portion of the first conductive wire.

11. The coupled inductor according to claim 10, wherein the body comprises a magnetic body.

12. The coupled inductor according to claim 11, wherein the magnetic body comprises a T core, wherein the first coil and the second coil are wound around a pillar of the T core.

13. The coupled inductor according to claim 1, wherein the first surface is a bottom surface of the body.

14. The coupled inductor according to claim 13, wherein the first electrode extends from a first edge to a second edge of the bottom surface of the body, and the second electrode extends from the first edge to the second edge of the bottom surface of the body, wherein said first edge and said second edge are two opposite edges of the bottom surface of the body, wherein the third electrode extends from the first edge to the second edge of the bottom surface of the body, wherein the third electrode is disposed along a third edge of the bottom surface of the body and the fourth electrode is disposed along a fourth edge of the bottom surface of the body, wherein said third edge and said fourth edge are two opposite edges of the bottom surface of the body.

15. The coupled inductor according to claim 13, wherein the first electrode extends to a first lateral surface of the body, and the second electrode extends to a second lateral surface of the body, wherein said first lateral surface and said second lateral surface are two opposite lateral surfaces of the bottom surface of the body.

16. The coupled inductor according to claim 13, wherein the third electrode extends to a third lateral surface of the body, and the fourth electrode extends to a fourth lateral surface of the body, wherein said third lateral surface and said fourth lateral surface are two opposite lateral surfaces of the bottom surface of the body.

17. The coupled inductor according to claim 13, wherein a first lead is embedded inside the body with at least one portion of the lead exposed from the bottom surface of the body to form the first electrode.

18. The coupled inductor according to claim 17, wherein a through hole is formed in the first lead, wherein a portion of the body is disposed inside the through hole.

* * * * *